United States Patent [19]

McGrath

[11] 4,084,397
[45] Apr. 18, 1978

[54] ARBOR ASSEMBLY FOR ROTARY MOWERS

[75] Inventor: Laurence R. McGrath, Cedarburg, Wis.

[73] Assignee: Allis-Chalmers Corporation, Milwaukee, Wis.

[21] Appl. No.: 774,813

[22] Filed: Mar. 7, 1977

Related U.S. Application Data

[63] Continuation of Ser. No. 644,881, Dec. 29, 1975, abandoned.

[51] Int. Cl.$^2$ ............................................. A01D 55/18
[52] U.S. Cl. ........................................ 56/255; 56/295; 74/230.3
[58] Field of Search .................... 56/255, 17.5, 295, 6, 56/10.3, 503, 320.1, 320.2; 74/230.3, 230.8, 230.01; 308/187.1, 36.1, 36.3, 36.4

[56] References Cited

U.S. PATENT DOCUMENTS

| | | | |
|---|---|---|---|
| 2,763,116 | 9/1956 | Flinchbaugh et al. | 56/255 X |
| 3,731,472 | 5/1973 | Kamlukin | 56/17.5 X |
| 3,762,230 | 10/1973 | Steil et al. | 56/255 X |
| 3,890,773 | 6/1975 | Frost | 56/255 |
| 3,897,678 | 8/1975 | Zurek et al. | 56/17.5 X |

*Primary Examiner*—Jay N. Eskovitz
*Attorney, Agent, or Firm*—Robert C. Sullivan

[57] ABSTRACT

An arbor assembly for use with rotary mowers, and the combination of such arbor assembly with a mower blade subassembly and with a pulley subassembly. The arbor assembly comprises a shaft having reduced diameter end portions defining upper and lower shoulders against which are seated the inner races of upper and lower antifriction bearings. The outer races of the upper and lower antifriction bearings are supported by bearing retainers supported by the mower deck. The opposite ends of the shaft are splined. The opposite ends of the shaft are also internally axially tapped. A mower blade subassembly is adapted to be mounted by means of a cap screw which engages the tapped lower end of the shaft. The mower blade subassembly comprises a blade adaptor and a mower blade which bears against the under surface of the blade adaptor. The mower blade is free to rotate relative to the shaft if the blade strikes an obstruction. A pulley subassembly is provided, and includes a hollow pulley hub having internal splines which engage the splined upper end of the shaft. A cap screw passes through the hollow pulley hub and engages the tapped upper end of the arbor shaft to secure the pulley subassembly to the upper end of the arbor assembly. The arbor assembly is adapted to interchangeably receive different pulley subassemblies, such as a pulley subassembly having two pulleys mounted on a common hub, or, alternatively, a pulley subassembly having only a single pulley mounted on the pulley hub.

7 Claims, 6 Drawing Figures

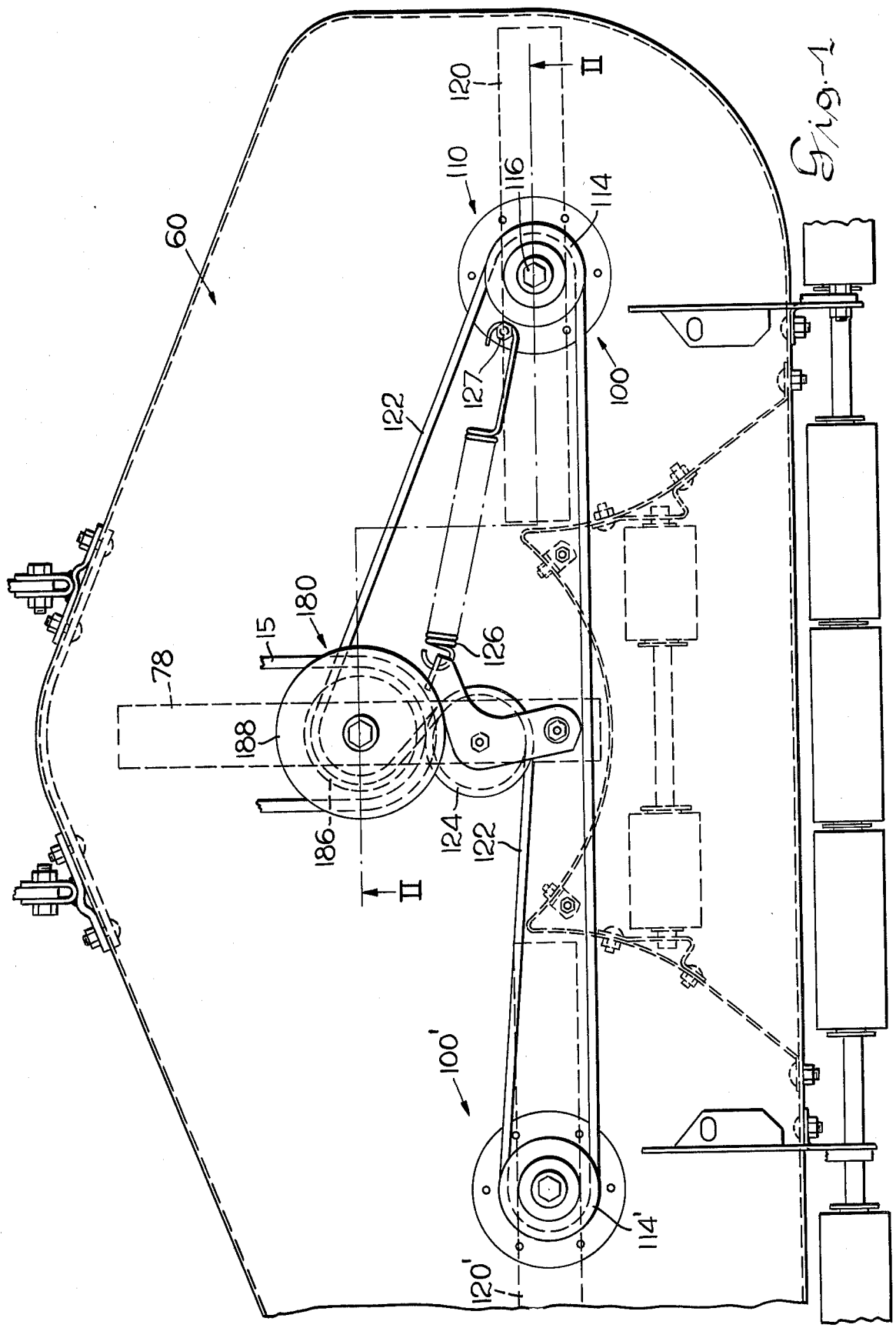

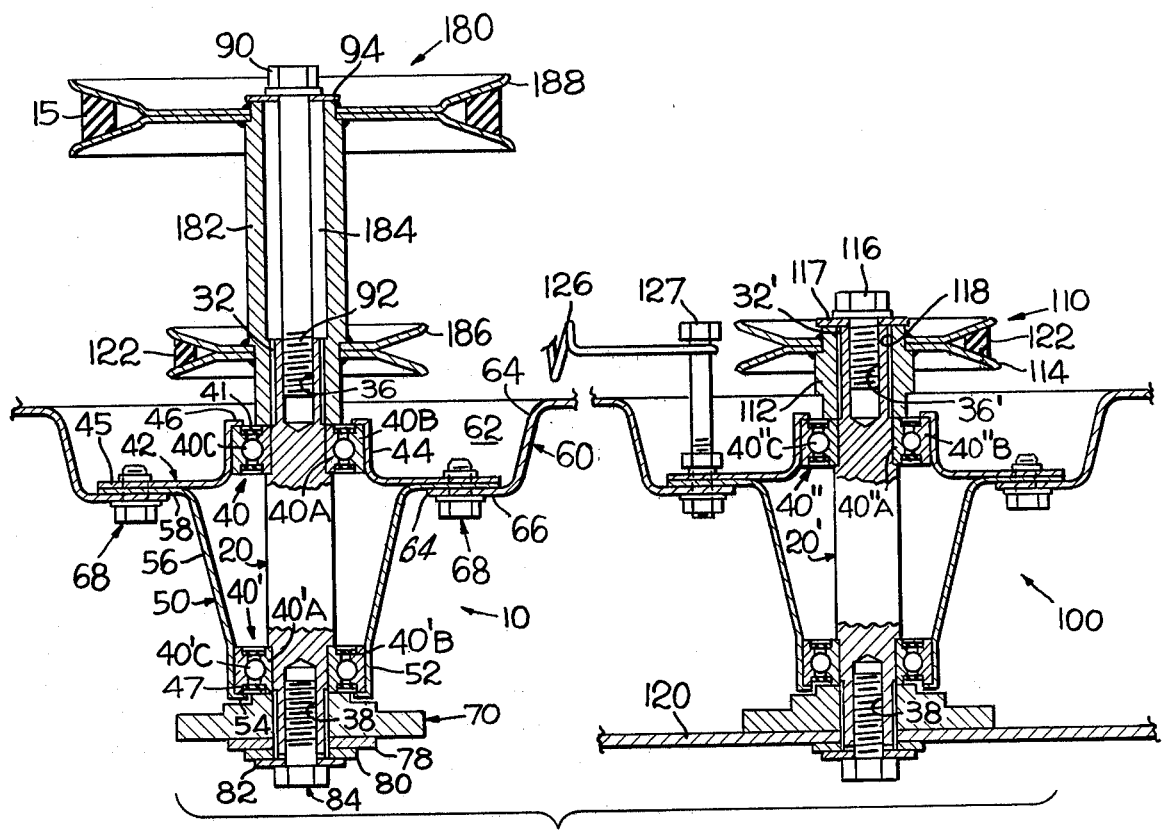
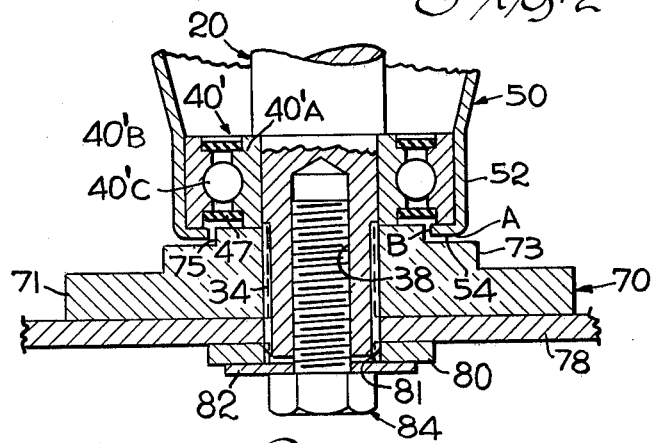
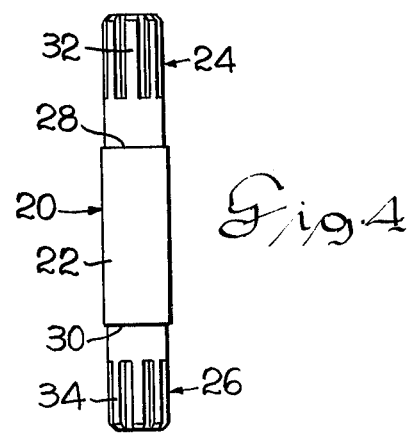
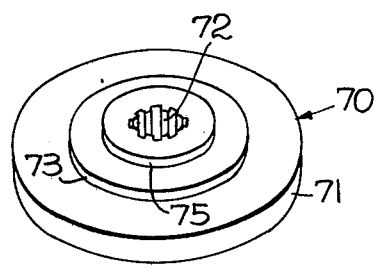

ARBOR ASSEMBLY FOR ROTARY MOWERS

This is a continuation of application Ser. No. 644,881 filed Dec. 29, 1975 now abandoned.

BACKGROUND OF THE INVENTION

Field of the Invention

This invention relates to arbor assemblies for rotary mowers and more particularly to an arbor assembly including a driven shaft or spindle which is adapted to support at its lower end a mower blade subassembly and to interchangeably support at its upper end any one of a plurality of pulley subassemblies.

STATEMENT OF THE INVENTION

It is an object of the present invention to provide an arbor assembly for a rotary mower which represents an improvement over the prior art with regard to safety, reliability and service aspects and which requires in its construction no welding or special torquing, and to the combination with such arbor assembly of a blade subassembly and a pulley subassembly.

It is a further object of this invention to provide an arbor assembly for use with rotary mowers which can be manufactured economically and with a minimum number of components as compared to the prior art.

It is a further object of this invention to provide an arbor assembly for use with rotary mowers which permits slippage of the mower blade without regard to direction of rotation of the drive spindle in the event that the mower blade strikes an obstruction such as a rock or the like, thereby providing a built-in safety feature which prevents breakage of the mower blade in the event of hitting such an obstruction.

It is a further object of the invention to provide an arbor assembly for use with rotary mowers, which arbor assembly is so constructed as to permit easy interchangeability of different types of pulley subassemblies for use with the same arbor assembly.

It is a further object to provide an arbor assembly for use with rotary mowers which includes in combination with the other features of the invention a cap screw or the like for holding the mower blade in assembled relation with the arbor assembly, and which further includes structural features which prevent any unintended winding or unwinding movement of the blade cap screw relative to the drive shaft or spindle on which the mower blade is mounted.

It is a further object of the invention to provide an arbor assembly for use with rotary mowers in which the arbor assembly is adapted to support a blade adaptor which is so constructed and so related to the lower arbor bearing and to the retainer or housing therefor as to provide a "labyrinth effect" which minimizes ingress of grass or the like to the lower arbor bearing and thus minimizes damage to the bearing seal.

In achievement of these objectives, there is provided in accordance with an embodiment of the invention an arbor assembly for use with rotary mowers, and the combination of such arbor assembly with a mower blade subassembly and with a pulley subassembly, both of which subassemblies are adapted to be secured to the arbor assembly. The arbor assembly comprises a shaft or spindle having reduced diameter end portions defining upper and lower shoulders against which are seated the inner races of upper and lower antifriction bearings mounted with an interference fit on the reduced diameter shaft portions. The outer races of the upper and lower antifriction bearings are respectively supported by upper and lower bearing retainers or housings adapted, in turn, to be supported by the mower deck. The opposite reduced diameter end portions of the shaft are splined for the portion of their length which does not receive the antifriction bearing assemblies. The end portions of the shaft are also internally axially threadedly tapped.

At the lower end of the arbor assembly a mower blade subassembly is adapted to be mounted by means of a cap screw which threadedly engages the tapped lower end of the shaft. The mower blade subassembly comprises (1) a blade adaptor having internal splines which mesh with the splines at the lower end of the shaft; (2) the mower blade which bears against the under surface of the blade adaptor; (3) a clamp washer having splines which also mesh with the splines at the lower end of the shaft to prevent untightening or tightening of the capscrew during mower operation; (4) an ordinary washer; and (5) the cap screw which secures the mower blade subassembly to the arbor assembly. The mower blade is provided with an oversize passage therethrough, whereby the blade is free to rotate relative to the shaft if the blade strikes an obstruction.

At the upper end of the arbor assembly a pulley subassembly is provided, and includes a hollow pulley hub having internal splines at the lower end thereof which engage the splined upper end of the shaft. One or more pulleys may be rigidly secured to the outer periphery of the pulley hub. A cap screw passes through the hollow pulley hub and threadedly engages the tapped upper end of the arbor shaft to secure the pulley subassembly to the upper end of the arbor assembly. The arbor assembly is adapted to interchangeably receive different pulley subassemblies, such as a pulley subassembly having two pulleys mounted on a common hub, or, alternatively, a pulley subassembly having only a single pulley mounted on the pulley hub.

Further objects and advantages of the invention will become apparent from the following description taken in conjunction with the accompanying drawings in which:

BRIEF DESCRIPTION OF THE DRAWINGS

FIG. 1 is a plan view of a three blade rotary mower, with the top casing thereof removed, and utilizing in connection with each of the mower blades and the driving pulleys therefor an arbor assembly in accordance with the present invention;

FIG. 2 is a view taken substantially along line II—II of FIG. 1;

FIG. 3 is an enlarged detailed view of the lower end of one of the arbor assemblies of FIGS. 1 and 2 showing the mower blade subassembly secured to the arbor assembly;

FIG. 4 is a detail view in elevation of the shaft or spindle of the arbor assembly showing the opposite splined ends thereof;

FIG. 5 is a detail view of the clamp washer which forms part of the mower blade subassembly, and FIG. 6 is an isometric view of the blade adaptor.

DESCRIPTION OF THE PREFERRED EMBODIMENT

Referring now to the drawings, and as best seen in FIG. 4, the arbor assembly includes a vertical shaft or spindle generally indicated at 20 including an intermediate portion 22 of larger diameter, an upper end portion generally indicated at 24 of reduced diameter as compared to intermediate portion 22, and a lower end portion generally indicated at 26 also of reduced diameter as compared to intermediate portion 22. Reduced diameter end portions 24 and 26 have the same diameters as each other.

The junction between the larger diameter intermediate shaft portion 22 and the reduced diameter upper shaft portion 24 defines a shoulder 28. Similarly, the junction between intermediate shaft portion 22 and the reduced diameter lower shaft portion 26 defines a shoulder 30. Shaft 20 is splined at its upper and lower ends, respectively, as indicated at 32 and 34. Also, each of the opposite ends of the shaft 20 is tapped with an internal thread as indicated at 36 and 38 for the upper and lower ends, respectively.

An antifriction bearing in the form of a ball bearing assembly, generally indicated at 40, comprising an inner race 40A, an outer race 40B, and ball bearings 40C between the inner and outer races, is seated on the reduced diameter portion 24 of the upper end of shaft 20 beneath the splined portion 32, and with the inner race 40A of the bearing assembly 40 seating against the upper shoulder 28. Bearing assembly 40 includes at the upper end a seal 41 which overlies the ball bearings 40C. Inner race 40A of the ball bearing assembly 40 is pressed onto reduced shaft portion 24 on the portion thereof below the splines 32 with an interference fit to assure positive rotation of inner race 40A of the bearing with the shaft rotation. In a similar manner, a second ball bearing assembly generally indicated at 40' is provided at the lower end of the shaft or spindle 20, the lower bearing assembly 40' including an inner race 40'A, an outer race 40'B, and interposed ball bearings 40'C. Inner race 40'A of lower bearing assembly 40' is press fitted with an interference fit onto the reduced diameter portion 26 of the lower end of shaft 20 above the splines 34 and with inner race 40'A bearing against shoulder 30.

An upper bearing retainer or bearing housing, generally indicated at 42, which may be made of stamped-out metal, is provided with a circular cross-section housing section 44, which is adapted to receive outer race 40B of upper bearing assembly 40 with a sliding fit, housing portion 44 having the upper end thereof turned radially inwardly to provide a flange indicated at 46 which overlies outer bearing race 40B and, together with generally cylindrical housing section 44 of bearing retainer 42, encapsulates outer race 40B of upper bearing assembly 40.

In a similar manner, to receive and retain the lower bearing assembly 40', a lower bearing retainer or housing generally indicated at 50 is provided and may be made of stamped-out metal. Bearing retainer 50 for lower bearing assembly 40' includes a generally cylindrical housing portion 52 to receive outer race 40'B of lower bearing assembly 40' with a sliding fit. Housing portion 52 is provided at its lower end with a radially inwardly turned flange 54 which, together with the remainder of housing portion 52, serves to encapsulate outer race 40'B of lower bearing assembly 40'. Bearing assembly 40' is provided with a seal 47 in underlying relation to ball bearings 40'C.

The bearing retainer or housing 50 for lower bearing assembly 40' includes an upwardly tapered wall 56 which merges into a horizontal flange 58. The horizontal flange 45 of upper bearing housing 42 and the horizontal flange 58 of the lower bearing housing 50 have the same outer radii with reference to the axis of shaft 20.

The portion of the mower housing 60 where the arbor assembly thus far described is adapted to be mounted is provided with a well or sump 62 having a central opening or aperture 64 through which the arbor assembly can extend. The lower end of well 62 of mower housing or deck 60 is provided with a horizontal wall portion 66 in bounding relation to aperture 64 in the mower deck, and the horizontal flange portions 45 and 58 of upper and lower bearing housings 42 and 50, respectively, are adapted to seat on the upper surface of the horizontal mower housing wall portion 66 and to be securely fastened thereto by suitable bolts or other suitable fastening means generally indicated at 68 which extend through the mower wall portion 66 and through the superimposed flange portions 45 and 58 of the respective upper and lower bearing housings 42 and 50.

Suitably mounted on the lower end of the arbor assembly thus far described is what may be referred to generally as the "mower blade subassembly" comprising the following elements which will be described hereinafter in more detail: (1) blade adaptor 70; (2) mower blade 78; (3) clamp washer 80 having splines on the inner periphery thereof; (4) plain washer 82; and (5) cap screw 84.

The blade adaptor, generally indicated at 70, and which forms part of the mower blade subassembly is mounted contiguous the lower end of the arbor assembly and is provided with a central splined passage therethrough indicated at 72 which is adapted to engage the splines 34 on the reduced end portion 26 at the lower end of shaft or spindle 20 to prevent rotation of blade adaptor 70 relative to shaft 20. The axial dimension of blade adaptor 70 is so related to the axial dimension of the splined portion 34 at the lower end of shaft 20 that when blade adaptor 70 is assembled in position as shown in FIGS. 1 and 2, the splined portion 34 extends below the blade adaptor 70 a sufficient distance to receive mower blade 78 and the clamping washer 80, both to be described hereinafter. A mower blade 78 is positioned on the splined portion 34 of shaft 20 immediately below blade adaptor 70, the mower blade 78 having a central passage therethrough of larger diameter than the outer diameter of the splined end 34 whereby to permit rotation of the blade 78 relative to the shaft 20 (or rotation of shaft 20 relative to mower blade 78) if mower blade 78 should strike an obstruction, such as a rock. A clamp washer 80 is positioned coaxially about the lower end of shaft 20 immediately beneath mower blade 78, clamp washer 80 being provided on its inner periphery with splines 81 which mesh with the splines 34 at the lower end of shaft 20. A cap screw, generally indicated at 84, has the threaded shank portion thereof in threaded engagement with the threaded tapped passage 38 at the lower end of shaft 20, and an ordinary ring washer 82 is seated on the upper surface of the head portion of cap screw 84, ring washer 82 being interposed between the head portion of cap screw 84 and the clamp washer 80. Cap screw 84 is tightened to apply axial clamping force against bearing inner race 40'A, against blade adaptor 70, against mower blade 78, against clamp washer 80, and against ring washer 82 to hold these parts in sufficiently tightly assembled relation with respect to each other.

The mower blade 78 is held in place and driven by the frictional force applied between blade adaptor 70 and clamp washer 80. The construction includes the safety feature that, under shock loading conditions such as might be caused by the mower blade striking an obstruction such as a rock, the mower blade 78 can slip relative to shaft 20, since the passage through mower blade 78 is of larger inner diameter than the outer diameter of the splined portion 34 of the lower end of shaft 20.

A further important feature of the construction is the fact that clamping washer 80 has an internal spline 81 which meshes with the spline 34 at the lower end of shaft 20. The splined engagement of clamp washer 80 with the splined portion 34 of shaft 20 holds clamping washer 80 rotationally in place relative to shaft 20 and eliminates the possibility of any rotating member during the operation of the mower causing the winding or unwinding of lower cap screw 84. Reverse rotation of the mower blade 78 under shock load (as upon hitting an obstruction) will not cause either unwinding or winding of cap screw 84 since the engagement of the internal splines 81 of clamping washer 80 with splines 34 of shaft 20 do not allow reverse torque on cap screw 84 which would cause either unwinding or winding of the cap screw 84. An arrangement for preventing loosening or tightening during use of a cap screw in a mower blade subassembly is shown by U.S. Pat. No. 2,862,376 issued to Clement J. Thelander on Dec. 2, 1958.

The blade adaptor 70 is circular in horizontal cross-section and includes a stepped diameter including a maximum diameter portion 71 at its lower portion which frictionally bears against the upper surface of mower blade 78. Blade adaptor 70 also includes an intermediate stepped portion 73 of intermediate diameter and an upper stepped portion 75 which has the minimum diameter of blade adaptor 70. Stepped portion 75 has a diameter slightly less than the inner diameter of radially inwardly turned flange portion 54 at the lower end of cylindrical bearing housing portion 52 of lower bearing retainer 50, sufficient to provide a rotating clearance between stepped portion 75 of blade adaptor 70 and the radially inner periphery of bearing housing flange portion 54.

Blade adaptor 70 serves several different functions including the following: (1) it provides a flat surface against which the mower blade 78 can bear to insure that the somewhat flexible mower blade is maintained in a plane perpendicular to the axis of rotation of shaft or spindle 20; (2) the engagement of the facing surfaces of the under surface of large diameter portion 71 of blade adaptor 70 and the facing surface of mower blade 78, together with the axial force applied by cap screw 84 and clamp washer 80, provides a good frictional driving connection for mower blade 78 which is not itself positively attached to shaft 20; and (3) the blade adaptor, lying immediately beneath the inner race 40'A of the lower bearing assembly 40', helps to retain inner race 40'A properly axially located in position.

In addition to the foregoing functions of the blade adaptor 70, in the present construction it serves the additional function of cooperating with the lower end of cylindrical bearing retainer portion 52 and with the lower antifriction bearing 40' supported thereby to provide a "labyrinth effect" between blade adaptor 70 and the contiguous bearing retainer portion 52 and bearing 40' which minimizes ingress of grass clippings or the like to the bearing 40' and seal 47 thereof, thereby protecting the bearing 40' and seal 47 against possible damage from the ingress of grass. The labyrinth effect is defined by the narrow horizontal annular passage identified as "A" in FIG. 3 which is defined by the clearance space between the upper surface of intermediate stepped portion 73 of blade adaptor 70 and the facing under surface of radially extending flange 54 at the lower end of lower bearing retainer 50; the labyrinth also including the short communicating axially-extending annular passage identified as "B" (FIG. 3) which is bounded by the radially inner periphery of inturned flange 54 at the lower end of lower bearing retainer 50, and by the facing radially outer periphery of the uppermost stepped portion 75 of blade adaptor 70.

A suitable pulley subassembly may be interchangeably mounted on the upper end of shaft 20, as best seen in FIG. 2. Thus, in FIG. 2, the assembly shown at the left and generally indicated at 10 is provided with a double pulley subassembly generally indicated at 180. At the right-hand side of FIG. 2, in the assembly generally indicated at 100 a single pulley subassembly generally indicated at 110 is shown mounted on an arbor assembly which is similar to that used with the double pulley subassembly. In other words, the same arbor assembly may be used to interchangeably receive the double pulley subassembly 180 of FIG. 2 or the single pulley subassembly 110 of FIG. 2.

The double pulley subassembly 180 seen in FIG. 2 includes a pulley hub 182 which is hollow throughouts its length, as indicated at 184. A lower pulley 186, and a larger diameter upper pulley 188 are rigidly secured as by welding to the outer periphery of hub 182 in vertically spaced relation to each other. The internal surface of pulley hub 182 contiguous the lower end thereof is internally splined to engage the splines 32 at the upper end of shaft 20, thereby preventing relative rotation between pulley hub 182 and shaft 20, and providing torque transmission from the pulley subassembly to the shaft 20 through the splined connection of the pulley subassembly 180 to shaft 20. An elongated cap screw 90 is threaded at the lower portion thereof, as indicated at 92, and extends through the hollow interior 184 of hub 182 and into threaded engagement with the threaded tap 36 in the upper end of shaft 20. A suitable washer 94 is interposed between the under surface of the head end of cap screw 90 and the upper end of hub 182. The cap screw 90 is tightened downwardly into threaded engagement with the threaded tap 36 in the upper end of shaft or spindle 20 and the lower end of hub 182 seats against the upper surface of inner race 40A of upper ball bearing assembly 40, thereby axially clamping the pulley hub 182 in position.

The single pulley subassembly 110 is attached to the arbor assembly shown on the right-hand side of the view of FIG. 2 and in a similar manner to that just described in connection with the double pulley subassembly. The arbor assembly shown at the right in FIG. 2 to which the single pulley subassembly is attached is the same as that described in connection with the double pulley subassembly, shown at the left in FIG. 2, and corresponding parts use the same reference numerals primed. The single pulley subassembly 110 includes a relatively short pulley hub 112 which has rigidly mounted, as by welding, on the outer peripheral surface thereof a single pulley 114. Pulley hub 112 has a hollow axial passage 118 therethrough which receives the relatively short cap screw 116 which threadedly engages the tapped passage 36' at the upper end of the corresponding shaft 20' to secure pulley hub 112 to the upper end of shaft 20'. Shaft 20' is similar to shaft 20 previously described.

In addition, the axial passage 118 through the hub 112 is provided at the lower portion thereof with internal splines which mesh with the splines 32' at the upper end of the shaft 20', (in the same manner as previously described for the two-pulley hub) whereby to prevent rotation of pulley hub 112 relative to shaft 20'. Cap screw 116 is tightened down into threaded engagement with the threaded tap 36' at the upper end of shaft 20' and the lower end of pulley hub 112 seats on the upper surface of inner bearing race 40'' contiguous the upper portion of the shaft 20'. A washer 117 (FIG. 2) is interposed beneath the under surface of the head of cap screw 116 and the upper end of pulley hub 112. In the assembly 100 at the right-hand side of FIG. 1, the blade subassembly is attached to the lower end of shaft 20' in the same manner as in the case of the double pulley assembly 10 at the left-hand side of FIG. 2, and will not be described in detail again.

FIG. 1 shows the manner in which the arbor, pulley and blade assemblies 10 and 100 may be oriented on a three-blade rotary mower. The view of FIG. 1 shows the double pulley assembly 10 supported in a generally central location with respect to the mower deck 60, with the lower and upper pulleys 186 and 188, respectively, projecting above the level of the deck 60 and with the mower blade 78 extending below the deck level. Positioned on either side of the center assembly 10 are the outer assemblies generally indicated at 100' and 100. Arbor, pulley and blade assembly 100' is similar to the assembly 100, shown in detail in FIG. 2 of the drawings, and includes only a single pulley 114 which is positioned above deck level and a mower blade 120' which is positioned below deck level. A drive belt 15 (FIG. 1) driven from an engine or the like is trained around upper pulley 188 of center assembly 10 whereby to impart rotation to shaft 20 through the splined connection of the pulley subassembly to the shaft 20, and thus to mower blade 78 carried by the lower end of shaft 20. A second drive belt 122 is driven from lower pulley 186 on shaft 20, belt 122 passing around pulley 114' carried by the left-hand outer assembly 100' with respect to the view of FIG. 1, drive belt 122 also passing around pulley 114 carried by the outer arbor assembly 100, which is shown at the right-hand side of FIG. 1. Drive belt 122 is also engaged by a pivotally mounted idler pulley 124 which is biased into engagement with belt 122 by means of a spring 126, whereby to maintain sufficient wrap-around of belt 122 about lower pulley 186 of the center assembly 10 and also to maintain sufficient tension in belt 122 to promote a good transfer of driving power from drive belt 122 to driven pulleys 114' and 114. The opposite end of spring 126 is anchored to the mower housing by a bolt 127.

In summary, as previously pointed out, it is important that the inner races 40A and 40'A of the respective antifriction bearing assemblies 40 and 40', respectively, should be mounted on the shaft 20 with an interference fit (a force fit) to assure positive rotation of the respective bearing inner races with the shaft 20.

It is also important that the bearing bores defined by the cylindrical bearing housing sections 44 and 52 of the upper and lower bearing housings 42 and 50 be concentric about a common axis, namely the axis of shaft 20.

It is also important as pointed out previously that rotation of mower blade 78 may be altered under shock load conditions by reverse rotation of blade 78 with respect to blade adaptor 70 and clamping washer 80. This provides a "slip clutch" which is a definite safety benefit.

Furthermore, mower blade 78 must be mounted concentrically with the axis of rotation of shaft 20, whereby to minimize vibration and maximize safety.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In combination, an arbor assembly for use with rotary mowers comprising a shaft, said shaft having an intermediate portion of greater diameter and opposite upper and lower end portions of reduced diameter whereby to define a shoulder between each of said end portions and said intermediate portion, an upper and a lower antifriction bearing assembly respectively positioned on the respective opposite end portions, each of said antifriction bearing assemblies comprising an inner race and an outer race, the inner race of each of said antifriction bearing assemblies being engaged with its corresponding reduced diameter end portion with an interference fit and also seating against the shoulder contiguous the corresponding reduced diameter end portion of said shaft, the outer race of each of said bearing assemblies being adapted to be engaged by a corresponding bearing retainer means supported by the mower housing, the outermost portion of each of said reduced diameter end portions lying beyond the corresponding bearing assembly and being splined on the exterior surface thereof, a pulley subassembly in splined engagement with the splines of said upper end portion of said shaft, and a mower blade subassembly carried by said lower end portion of said shaft, with a portion of said mower blade subassembly being in splined engagement with the splines of said lower end portion, each of the opposite end portions of said shaft being tapped with an internal thread for receiving a cap screw, the cap screw at said upper end portion serving to retain said pulley subassembly assembled to said upper end portion of said shaft, the cap screw at said lower end portion of said shaft serving to retain said mower blade subassembly assembled to said lower end portion of said shaft, said mower blade subassembly comprising a blade adaptor positioned immediately contiguously beneath said lower bearing assembly, said blade adaptor being positioned coaxially about the reduced diameter lower end portion of said shaft and including splines which are in splined engagement with the splines on said reduced diameter lower end portion of said shaft, a mower blade positioned coaxially about said reduced diameter lower end portion of said shaft and immediately contiguous the under surface of said blade adaptor, said mower blade having a radial clearance relative to said reduced diameter lower end portion of said shaft permitting relative rotation between said mower blade and said shaft under shock load conditions on said mower blade, said cap screw at said lower end portion of said shaft being engaged with the internally tapped thread at said lower end portion of said shaft to retain said mower blade subassembly assembled to said lower end portion of said shaft.

2. The combination defined in claim 1 including a clamp washer positioned about said shaft beneath said mower blade, said clamp washer including splines which are in splined engagement with the splines on said reduced diameter lower end portion of said shaft, whereby to prevent unwinding or winding of said cap screw under shock load conditions or the like.

3. In combination, an arbor assembly for use with rotary mowers comprising a shaft, said shaft having an intermediate portion of greater diameter and opposite upper and lower end portions of reduced diameter whereby to define a shoulder between each of said end portions and said intermediate portion, an upper and a lower antifriction bearing assembly respectively positioned on the respective opposite end portions, each of said antifriction bearing assemblies comprising an inner race and an outer race, the inner race of each of said antifriction bearing assemblies being engaged with its corresponding reduced diameter end portion with an interference fit and also seating against the shoulder contiguous the corresponding reduced diameter end portion of said shaft, the outer race of each of said bearing assemblies being adapted to be engaged by a corresponding bearing retainer means supported by the mower housing, the outermost portion of each of said reduced diameter end portions lying beyond the corresponding bearing assemblies and being splined on the exterior surface thereof, a pulley subassembly in splined engagement with the splines of said upper end portion of said shaft, and a mower blade subassembly carried by said lower end portion of said shaft, with a portion of said mower blade subassembly being in splined engagement with the splines of said lower end portion, said mower blade subassembly comprising a blade adaptor positioned immediately contiguously beneath said lower bearing assembly, said blade adaptor being of stepped diameter and including a larger diameter portion, the lower surface of which is in bearing relation to the mower blade, said blade adaptor also including an intermediate diameter portion located above said larger diameter portion, and a smaller diameter portion lying above said intermediate diameter portion, each of said portions of said blade adaptor respectively including a corresponding upper surface, the bearing retainer means which engages the outer race of the lower antifriction bearing including a radially inwardly turned flange whose under surface is axially spaced a short distance above the upper surface of said intermediate diameter portion of said blade adaptor, the radially inner diameter of said radially inwardly turned flange being spaced radially outwardly a short distance from the outer diameter of said smaller diameter portion of said blade adaptor, whereby said spacing of said radially inwardly turned flange from said intermediate diameter portion and from said smaller diameter portion of said blade adaptor defines a labyrinthian path rendering difficult the ingress of grass or the like to said lower antifriction bearing assembly.

4. An arbor assembly for use with rotary mowers comprising a shaft, said shaft having an intermediate portion of greater diameter and opposite normally upper and lower end portions of reduced diameter whereby to define a shoulder between each of said end portions and said intermediate portion, a normally upper and a normally lower antifriction bearing assembly respectively positioned on the respective opposite end portions of said shaft, each of said antifriction bearing assemblies comprising an inner race and an outer race, the inner race of each of said antifriction bearing assemblies being engaged with its corresponding reduced diameter end portion and seating against the shoulder contiguous the corresponding reduced end portion of said shaft, a normally upper and a normally lower bearing retainer means for respectively directly engaging the corresponding outer race of the respective normally upper and normally lower antifriction bearing assemblies, said normally upper bearing retainer means including at its upper end an upper radially inwardly turned flange in overlying axially retaining relation to the upper surface of said outer race of said normally upper antifriction bearing assembly, said normally upper bearing retainer means additionally comprising an upper body portion beneath said upper radially inwardly turned flange and in circumferentially enclosing relation to said outer race of said normally upper antifriction bearing assembly, and a radially outwardly extending first flange at the lower end of said normally upper bearing retainer means, said normally lower bearing retainer means including at its lower end a lower radially inwardly turned flange in underlying axially retaining relation to the lower surface of said outer race of said normally lower antifriction bearing assembly, said normally lower bearing retainer means including a lower body portion above said lower radially inwardly turned flange and in circumferentially enclosing relation to said outer race of said normally lower antifriction bearing assembly, and an additional body portion tapering upwardly and radially outwardly with a generally conical-like contour from the upper end of said lower body portion whereby to impart increased structural strength to said normally lower bearing retainer means, and a radially outwardly extending second flange extending from the upper end of said additional body portion, means securing said radially outwardly extending first flange of said normally upper bearing retainer means to said radially outwardly extending second flange of said normally lower bearing retainer means, both said first and said second radially outwardly extending flanges being adapted to be detachably secured to the mower housing, the axially outermost portion of each of said reduced diameter end portions of said shaft lying beyond the respective corresponding bearing assembly and respectively being adapted at said normally upper end portion of said shaft to be detachably connected to and in torque transmitting engagement with a pulley subassembly whereby to permit said shaft to interchangeably receive various pulley subassemblies including pulley subassemblies having different numbers of pulleys mounted thereon, and being adapted at said normally lower end portion of said shaft to be in supporting relation to a mower blade subassembly.

5. An arbor assembly as defined in claim 4 in which said radially outwardly extending first and second flanges are detachably secured to each other, whereby said normally upper and said normally lower bearing retainer means are detachably secured to each other.

6. An arbor assembly as defined in claim 5 in which a common fastening means detachably secures said radially outwardly extending first and second flanges to each other and additionally secures both said first and said second flanges to said mower housing.

7. An arbor assembly as defined in claim 4 in which said normally upper and said normally lower bearing retainer means are each respectively formed of a single piece of material.

* * * * *